Patented Sept. 15, 1931

1,823,748

UNITED STATES PATENT OFFICE

LEOPOLD LASKA AND OSKAR HALLER, OF OFFENBACH-ON-THE-MAIN, GERMANY, ASSIGNORS TO GENERAL ANILINE WORKS, INC., OF NEW YORK, N. Y., A CORPORATION OF DELAWARE

NAPHTHYLAMINE CARBOXYLIC ACID DERIVATIVES AND PROCESS OF MAKING SAME

No Drawing. Application filed March 8, 1929, Serial No. 345,584, and in Germany March 6, 1928.

Our present invention relates to naphthylamino-hydroxy-phenyl carboxylic acids, more particularly it relates to 1(2'-naphthylamino)-4-hydroxy-phenyl carboxylic acids of the following general formula:

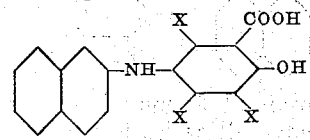

wherein one X means hydrogen, halogen, or an alkyl group and the other X's mean hydrogen. These compounds are obtainable by treating an alkali salt of a 1(2'-naphthylamino)-4-hydroxyphenyl compound of the general formula

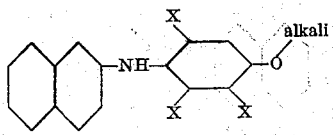

wherein the X's have the aforesaid significance, with carbonic acid at elevated temperature and superatmospheric pressure. This course of reaction could not be foreseen since no carboxylic acids result by heating an alkali salt of a para-aminophenol with carbonic acid at superatmospheric pressure.

The carboxylic acids obtained by our process, whereof those containing halogen or an alkyl group are new, may be employed as intermediates for the production of dyestuffs.

In order to further illustrate our invention the following examples are given, the parts being by weight and all temperatures in centigrade degrees, but we wish it to be understood that we are not limited to the particular products nor reaction conditions mentioned therein:

*Example 1.*—940 parts of 1(2'-naphthylamino)-4-hydoxy-benzene are dissolved in 267.2 parts of potassium hydroxide of 83% strength and 2000 parts of water. Then the water is distilled off in a vessel provided with a strong stirrer, finally in vacuo. The mass thus obtained is saturated when cool with carbonic acid while gradually increasing the pressure to 25 atmospheres. Then it is slowly heated to 170° and maintained at this temperature for about 12 hours. The reaction mass is worked up by dissolving it in water, filtering the solution and precipitating the reaction product by means of dilute hydrochloric acid. The raw carboxylic acid thus obtained may be purified by dissolving it in a dilute sodium acetate solution and again precipitating it by the addition of an acid. It crystallizes from benzene hydrocarbons and solvent naphtha in the form of light prisms melting at 175° and is identical with the acid described by Bucherer (Journ. f. prakt. Chemie, vol. 75 (new series), page 281) and corresponding to the formula:

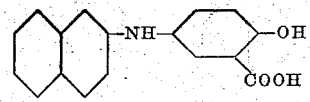

It shows when dissolved in dilute alcohol and mixed with a dilute ferric chloride solution a dark blue tint, whereas 1(2'-naphthylamino)-4-hydroxy-benzene analogously treated yields a dark red tint.

When starting from the sodium salt of 1(2'-naphthylamino)-4-hydroxy-benzene the process can be carried out in an analogous manner.

*Example 2.*—249 parts of 1(2'-naphthylamino)-2-methyl-4-hydroxy-benzene are dissolved with 66 parts of potassium hydroxide of 83% strength in 750 parts of water. Then the solution is evaporated in vacuo until dry and the residue is treated with carbonic acid and worked up as described in Example 1. The new 1(2'-naphthylamino)-2-methyl-4-hydroxy-benzene carboxylic acid thus obtained corresponds to the formula

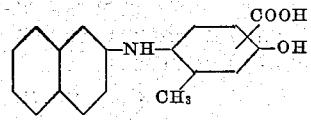

and represents when recrystallized from toluene yellow leaflets melting at 213–214°. Its dilute alcoholic solution becomes dark violet after the addition if ferric chloride.

*Example 3.*—When 1(2'-naphthylamino)-3-methyl-4-hydroxy-benzene is treated as described in Example 2, the new 1(2'-naphthylamino)-3-methyl-4-hydroxy-benzene-5-carboxylic acid is obtained. It corresponds probably to the formula:

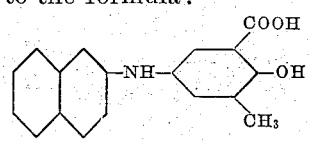

and crystallizes from toluene or xylene in the form of leaflets melting at 214–215°. Its alcoholic solution shows a cherry-red color when mixed with ferric chloride.

We claim:

1. A process which comprises treating an alkali salt of a 1(2′-naphthylamino)-4-hydroxy-phenyl compound of the general formula:

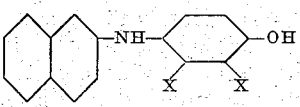

wherein one X means hydrogen, halogen or an alkyl group, the other X hydrogen, with carbonic acid at a temperature of about 170° C. under superatmospheric pressure.

2. A process which comprises treating an alkali salt of a 1(2′-naphthylamino)-4-hydroxy-phenyl compound of the general formula:

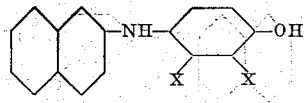

wherein one X means halogen or an alkyl group, the other X hydrogen, with carbonic acid at a temperature of about 170° C. under superatmospheric pressure.

3. As new compounds the 1(2′-naphthylamino)-4-hydroxy-phenyl carboxylic acids of the general formula:

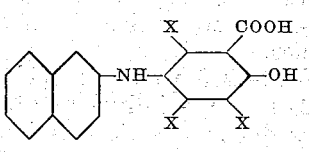

wherein one X means halogen or an alkyl-group, the other X's mean hydrogen, which compounds are colorless crystallized substances, having a definite melting point, soluble in alkalies, yielding a reddish to bluish color by mixing their alcoholic solution with ferric chloride.

4. As new compounds the 1(2′-naphthylamino)-4-hydroxy-phenyl carboxylic acids of the general formula:

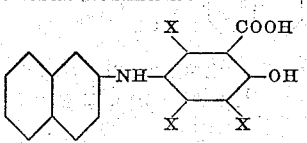

wherein one X means a methyl group, the other X's mean hydrogen, which compounds are colorless crystallized substances, having a definite melting point, soluble in alkalies, yielding a reddish to bluish color by mixing their alcoholic solution with ferric chloride.

5. As new compounds the 1(2′-naphthylamino)-4-hydroxy-methyl-phenyl carboxylic acids of the general formula:

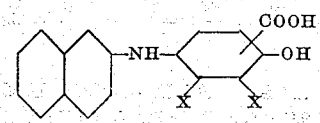

wherein one X means hydrogen and the other methyl, which compounds are colorless crystallized substances, having a definite melting point, soluble in alkalies, yielding a reddish to bluish color by mixing their alcoholic solution with ferric chloride.

6. As a new compound 1-(2′-naphthylamino)-4-hydroxy-2-methyl-phenyl-carboxylic acid of the formula:

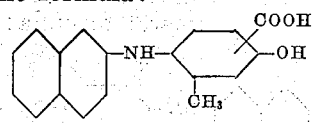

which compound forms when recrystallized from toluene yellow leaflets melting at 213° to 214° C., and the dilute alcoholic solution of which shows a dark violet coloration on the addition of ferric chloride.

7. As a new compound 1-(2′-naphthylamino)-4-hydroxy-3-methyl-phenyl-carboxylic acid of the formula:

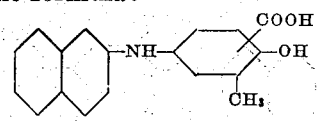

which compound forms when recrystallized from toluene leaflets melting at 214° to 215° C., and the dilute alcoholic solution of which shows a cherry-red coloration on the addition of ferric chloride.

In testimony whereof we affix our signatures.

LEOPOLD LASKA.
OSKAR HALLER.